United States Patent [19]
Vodnansky et al.

[11] 3,890,683
[45] June 24, 1975

[54] ROLLER WITH AN ELASTIC HYDROGEL LAYER FOR DYE APPLICATION OR PRINTING ON GLASS AND OTHER MATERIALS

[75] Inventors: Jiri Vodnansky; Artur Stoy, both of Prague, Czechoslovakia

[73] Assignee: Ceskoslovenska akademie ved No. 3 Narodni, Prague, Czechoslovakia

[22] Filed: Apr. 10, 1974

[21] Appl. No.: 459,618

Related U.S. Application Data

[63] Continuation-in-part of Ser. No. 427,432, Dec. 21, 1973, abandoned.

[30] Foreign Application Priority Data

Dec. 22, 1972  Czechoslovakia ................. 8917-72

[52] U.S. Cl. ................................. 29/132; 117/62.1
[51] Int. Cl. ............................................ B21b 31/08
[58] Field of Search ........... 161/160, 161; 29/129.5, 29/130, 132

[56] References Cited
UNITED STATES PATENTS

| | | | |
|---|---|---|---|
| 3,090,106 | 5/1963 | Raymond | 29/129.5 |
| 3,139,826 | 7/1964 | Rainwater | 29/129.5 X |
| 3,152,387 | 10/1964 | Macleod | 29/129.5 X |
| 3,222,209 | 12/1965 | Brundige et al. | 29/132 X |
| 3,455,003 | 7/1969 | Wood | 29/132 |
| 3,714,693 | 2/1973 | Peterson | 29/132 |
| 3,724,047 | 4/1973 | Peterson | 29/129.5 |
| 3,819,471 | 6/1974 | Sohnemann | 161/161 X |

FOREIGN PATENTS OR APPLICATIONS

| | | | |
|---|---|---|---|
| 518,197 | 3/1953 | Belgium | 29/129.5 |
| 692,945 | 8/1964 | Canada | 29/132 |

*Primary Examiner*—Alfred R. Guest
*Attorney, Agent, or Firm*—Murray Schaffer

[57]  ABSTRACT

There is disclosed a roller suitable for the application of coloring materials onto a surface, comprising (I) an inner core of a material which does not substantially swell in aqueous solutions, (II) an outer surface including (1) copolymers of acrylonitrile with at least one monomer selected from the group consisting of acrylamide, methacrylamide, ethylenically unsaturated monocarboxylic acids, ethylene sulfonic acid, salts of said acids and compatible mixtures thereof and (2) at least one swelling agent selected from the group consisting of $C_{1-4}$ alkylene and polyalkylene glycols and their methoxy and ethoxy derivatives, glycerol and acetyl derivatives thereof, (a) phenols, aromatic alcohols, hydroaromatic alcohols, $C_{1-14}$ aliphatic alcohols, esters and ethers of (a), (b) fatty acids and salts and esters of (b), methods of producing same and articles produced therefrom.

15 Claims, No Drawings ic alcohols, $C_{1-14}$ aliphatic alcohols and their esters and ethers, fatty acids, their salts and esters, and if desired, a minor amount of dimethylformamide or dimethylsulfoxide or cyclic ethylene carbonate.

ROLLER WITH AN ELASTIC HYDROGEL LAYER FOR DYE APPLICATION OR PRINTING ON GLASS AND OTHER MATERIALS

This application is a continuation-in-part of application Ser. No. 427,432, filed on Dec. 21, 1973, now abandoned to which disclosure reference is made.

This invention relates to a roller having an elastic hydrogel layer for color application, i.e., dye or pigment application or printing on the surfaces of glass or other materials, such as paper, plastics, and the like and to a method for making such a roller.

The invention relates more particularly to a roller which has a cylindrical core made from a material which does not substantially swell in water, such as metal, wood, plastic, hard rubber, ceramic and the like, and which has an outer cylindrical jacket of a hydrogel polymer, which polymer contains acrylonitrile and at least one further monomer selected from the group consisting of substituted and unsubstituted acrylamide, methacrylamide, acrylic acid, methacrylic acid, ethylenesulfonic acid or salts of the above acids as well as compatible mixtures thereof, and a swelling agent. The swelling agent contains at least one compound selected from the group consisting of water, $C_{1-4}$ alkylene glycols and polyalkylene glycols, wherein alkylene preferably is ethylene, propylene or butylene, the methoxy and ethoxy derivatives thereof, glycerol and its acetyl derivatives, phenols, aromatic alcohols, hydroaromatic alcohols, $C_{1-14}$ aliphatic alcohols and their esters and ethers, fatty acids, their salts and esters, and if desired, a minor amount of dimethylformamide or dimethylsulfoxide or cyclic ethylene carbonate.

A method is known in the art for the application of dyes (e.g., dispersions of rare metals) onto the edges of drinking glasses, tumblers, etc., by means of rollers which are covered with swollen gelatine. There are also known rollers covered with a low-crosslinked polymer of 2-hydroxyethyl methacrylate, these rollers are much more improved and hold substantially more than the gelatine rollers. The polymeric hydrogel layer has to be quite thick in order to dampen the impact and shock generated in a rapid automated production line, as otherwise the glasses being printed would break and the production line would then be interrupted. In addition thereto, the hydrogel layer has to be compatible with the dyes used, e.g., gold or platinum dispersions in ethereal oils, and must be well wetted by these dispersions so as to assure proper adhesion of the dye thereon. It is important that the hydrogel properties not change during operation, as for instance, by drying. Therefore, high boiling plasticizers, such as ethylene glycol or glycerol, are used instead of water. The relatively high cost thereof, is, however, disadvantageous where the rollers are covered with crosslinked 2-hydroxyethyl methacrylate polymer. This is due to the fact that in the process the monomer mixture is allowed to polymerize directly on the roller which is provided with a textile layer and the hydrogel layer formed is then machined in a frozen state so as to be homogeneous and smooth on its surface. To accomplish this purpose, the layer is maintained in a cooling mixture of an inert solvent, such as for example toluene, with solid carbon dioxide, at intervals between short periods of machining. The carbon dioxide brings about a stripping of the toluene to vent into atmosphere and the work atmosphere is accordingly unhealthy in addition to being a fire hazard. Solvents other than hydrocarbons cannot be used, either because of the swelling of the polymer which prevents machining, or because of their even higher volatility and hazardness in comparison to toluene.

It is accordingly an object of the instant invention to overcome one or more drawbacks of the prior art.

It is another object of the instant invention to provide for a printing roller and method of making the same.

These and other objects of the invention will become more apparent from the detailed disclosure and claim which follow hereinafter.

Broadly speaking, the instant invention includes the provision of a roller suitable for the application of coloring materials onto a surface, comprising (I) an inner core of a material which does not substantially swell in aqueous solutions, (II) an outer surface including (1) copolymers of acrylonitrile with at least one monomer selected from the group consisting of acrylamide, methacrylamide, N-lower alkyl acrylamide or methacrylamide, ethylenically unsaturated monocarboxylic acids, ethylene sulfonic acid, salts of said acids and compatible mixtures thereof and (2) at least one swelling agent selected from the group consisting of $C_{1-4}$ alkylene and polyalkylene glycols and the methoxy and ethoxy derivatives, glycerol and acetyl derivatives thereof, (a) phenols, aromatic alcohols, hydroaromatic alcohols, $C_{1-14}$ aliphatic alcohols, esters and ethers of (a), (b), fatty acids and salts and esters of (b).

In accordance with the above, there is provided a roller having at least one elastic hydrogel layer; the roller consists of an (cylindrical) inner core including a material which does not substantially swell in aqueous solution, such as water, i.e., for example, metal, such as cast iron, steel, rustless steel, aluminum or magnesium and alloys thereof, brass, etc., plastic, such as polypropylene, polyacetal resins, phenolic resins and resin hardened paper, or fabric, polyester laminates, acrylonitrile-butadiene-styrene copolymers and hard rubber, acrylic resins of various kinds, wood, resin or ammonia treated wood, ceramic, such as stoneware, hardened glass and the like, and which has an outer jacket or surface layer of hydrogel, which layer is formed from a polymer containing (1) acrylonitrile and at least one other monomer selected from the group consisting of (2) substituted or unsubstituted acrylamide or methacrylamide; ethylenically unsaturated monocarboxylic acids, i.e., acrylic acid, methacrylic acid; ethylenesulfonic acid, styrene sulfonic acid and salts of the aforesaid acids, such as sodium ethylene sulfonate, monoethylenically unsaturated dicarboxylic acids, and their anhydrides such as itaconic acid or maleineanhydride.

The ratio of (1) to (2) is generally about 1:5 to 4:1 %, preferably 1:3 to 3:1 % by weight. Where more than one of unit (2) is employed, the ratio of (1) to the two components of (2) is about the same; with the ratio of the two latter components ranging from about 1:10 to 10:1 %, preferably about 1:4 to 4:1 % by weight. The monomers may be substituted by groups such as lower alkyl $C_1 - C_6$, benzyl, chlorine and fluorine; they may also be straight or branched chain. There is also employed a swelling agent selected from the group consisting of water, $C_{1-4}$ alkylene glycols and poly $C_{1-4}$ alkylene glycols (wherein alkylene is preferably ethylene, propylene or butylene), their methoxy and ethoxy derivatives, glycerol and its acetyl derivatives, phenols such as phenol, butyl phenol, xylenol and their esters with phosphoric acids, and aromatic and hydroaromatic alcohols such as benzyl alcohol, hexahydrobenzyl alcohol, $C_{1-14}$ aliphatic and cycloaliphatic alcohols such as octanol and cyclohexanol preferably the $C_6$ to $C_{12}$ alcohols, and their esters such as dioctyl sebacate, dimethyl phthalate, and dioctyladipate, fatty acids such as valeric acid, dicarboxylic acids, such as adipic and sebacic acid, and their quarternary salts or esters such as triethanol ammonium adipate or cyclohexyl acetate or mixtures thereof; if desired admixed with a minor amount of dimethylformamide or dimethylsulfoxide or cyclic ethylene carbonate to improve the swelling activity.

The amount of the swelling agent employed will generally range from about 50 to 400 %, preferably 100 to 250 % by weight, based upon the weight of the copolymer, or, about 30 to 80 %, preferably about 40 to 70 % based upon the weight of the total composition. Where dimethylformamide or the like is employed, it is generally present in amounts of about 10 to 200 %, preferably about 20 to 60 % based upon the weight of copolymer, or, in amounts of about 5 to 50 %, preferably 10 to 25 %, based upon the weight of the total mixture. The material is believed to function as an inert organic solvent.

The method of manufacturing the novel roller, broadly comprises the application of the hydrogel layer which is accomplished by application of the copolymer solution onto the cylindric core in one or more layers which are subsequently coagulated in a bath containing for example, at least one compound selected from the group consisting of water, lower aliphatic alcohols ($C_1 - C_4$), acetone, dioxane, benzylalcohol, alkylene glycols ($C_2 - C_4$) and polyalkylene glycols, methoxy and ethoxy derivatives of alkylene glycols, glycerol and its acetyl derivatives as aforementioned. The foregoing is generally carried out at temperature of about −20° to +120°C, preferably 10° to 50°C, for a period of time sufficient to cause substantial adhesion of the bath materials to each preceding layer. The copolymer solution is applied layer by layer, each layer being applied after the preceding layer has been coagulated and any substantial excess of the coagulating solution removed.

The layers are applied onto the core, which preferably revolves around its horizontal axis, while the copolymer solution is applied preferably substantially continuously at one point and the solution layer is brought into contact with the coagulating liquid at another point. After the coagulation has been completed, the copolymer is, if desired, crosslinked by 0.1 to 20 %, preferably 1 to 10 % of an agent selected from the group consisting of cations of trivalent chromium, trivalent aluminum, trivalent iron, univalent copper, univalent silver, aldehydes such as formaldehyde, butyraldehyde and benzaldehyde, diepoxides or derivatives thereof, and polyisocyanates. Either the whole surface or only certain parts thereof may be treated by the above agents.

After coagulation, the roller surface or a part thereof may be also treated with a surplus of solutions containing about 0.1 to 80 %, preferably 1 to 25 % of other (non-cross-linking) agents, such as, mineral acids (i.e., HCl, $H_2SO_4$, $HNO_3$), nitrous acid, aqueous hydroxide solutions (i.e., Na, Ca, K) thionyl chloride, phosphor oxichloride and the like and then if desired with a surplus of hydroxylamine to change the properties of the surface, particularly its wettability and swellability. In carrying out either one or all three of the aforementioned steps, the amount of treating agent employed is calculated on the basis of the total mixture.

Each layer applied to the core of the printing, gilding or other roller is coagulated in a suitable bath which removes the solvent but does not dissolve the polymer; the excess coagulation liquid is preferably removed prior to the application of any further solution layer. If thinner layers are desired, the roller can revolve more rapidly. The thin layers may be more suitable, because their complete coagulation will take place over a shorter period of time in the bath and also any excess bath is more easily removed after coagulation and prior to the application of the next layer of the polymer solution, for instance by blowing with gas, or by contact with a porous elastic cylinder, filter paper, and the like. At the end of the application, the thickness of the last applied layer is preferably further reduced, so that the last of the applications is not perceptible and the final machining can then be omitted. The last layer can be readily applied onto a winding of a constant thickness and any respective unevennesses then readily straightened out.

The hydrogel layer obtained in this way is about 5 to 20 times stronger and considerably more elastic than the heretofore used layers of polymeric slightly crosslinked 2-hydroxyethyl methacrylate and its manufacture is much easier in addition to the fact that most hazards, such as fire and explosion are avoided. The layer as formed in accordance with the invention is highly elastic and also holds fast substantially longer in operation. The softness of the layer can be readily adjusted both by the degree of hydrolysis of the polyacrylonitrile, by the composition of the plasticizing nonvolatile liquid and by using a crosslinking agent, if desired. The plasticizing liquid, which maintains the elastic and swollen state of the hydrogel is advantageously anhydrous or substantially anhydrous and preferably does not contain another more volatile plasticizer in order to preserve elasticity and softness and protect the layer from drying out even after several hours of operation. Ethylene glycol, diacetine, glycerol and similar plasticizers are preferably applied in amounts as aforesaid in the presence of some water to prevent temporary dehydration and hardening. Preferably then, the content of water is gradually reduced by applying less to the concentrated plasticizer. Convenient solvents for polyacrylonitrile, such as dimethylsulfoxide, dimethylformamide or cyclic ethylene carbonate may also then be added in minor amounts as aforesaid.

Care should be taken that softening liquid is not transformed into a solvent by addition of too large amounts of the above solvents. Most solvents and precipitants having a high boiling temperature such as glycerol, ethylene glycol, diethylene glycol, dimethylsulfoxide and the like are hygroscopic and absorb large amounts of water from the atmosphere to achieve an equilibrium state between the solvent and atmosphere. Inasmuch as the atmospheric humidity changes, it is convenient to add water at the beginning in an amount which corresponds to about the average relative humidity of the air of the working environment. The approximately stable content of water is attained in this way if the air humidity oscillates around normal. Water per se, in combination with the aforesaid mixtures of high-boiling liquids, has a favorable effect upon the quality of the swollen polymer and it is recommended therefore to keep at least average and, if possible, a constant air humidity in the operation room.

Gilding paints, consisting of dispersions of gold in ethereal oils, and other commonly used dyes of this type have been found to satisfactorily wet the surface of the rollers prepared in accordance with the invention.

For application in reproduction printing, the wetting of the surface by various dyes can be varied by a preparatory treatment of the surface of the roller (total or in part) with agents which are operative to modify surface properties of the swollen polymer. This can be achieved, for instance, by short and, if desired, local action of concentrated strong mineral acids thereon, as for example sulfuric or phosphoric acid, at suitable temperatures, i.e., about 100°C. Another possibility is a treatment with a strong base, namely, with an alkaline hydroxide of high concentration, which transforms amide and nitrile groups on the surface layer of the roller into carboxylate groups. The carboxylic groups may then be converted into hydroxamic groups by known chemical reaction, for instance by transformation into —COCl groups with thionyl chloride and reaction with hydroxylamine. Another possible modification is a transformation of the amide groups on the surface of the roller into carboxylic groups by means of nitrous acid. Where the copolymer contains carboxylic groups in addition to nitrile groups, the modification can be carried out with, for example, univalent copper or silver ions. Carboxylic groups can be further employed to effect relatively stable ionic crosslinking with, for example, chromium (III), aluminum (III) or ferric cations. Amide groups alone may be crosslinked by treatment with aldehydes in an acid medium, the higher aldehydes have been found to increase the affinity to fatty dyes due to their longer alkyl group. Most chemical modifications can be generally used which are operative to increase or decrease hydrophilicity of the surface of the roller. These modifications can be carried out either upon the whole surface such as to enable the transfer of printed patterns onto the roller surface or only a part of the surface such as that which must or must not accept the dye, thereby, the dye is only applied uniformly or nonuniformly on the printing roller.

Generally known solvents for polyacrylonitrile, such as concentrated nitric acid, dimethylformamide, dimethylsulfoxide, cyclic ethylene carbonate, etc., are suitable as solvents for the above mentioned copolymers when mixed with water, acetone, and the like. In addition, concentrated aqueous solutions of water soluble salts from the Hoffmeister series may also be used, as for instance, zinc chloride, sodium or calcium thiocyanate, lithium bromide, etc., either alone or in admixture with other watersoluble salts, such as $CaCl_2$, $MgCl_2$ or NaCl, the solutions of which neither dissolve acrylonitrile copolymers in solution, nor precipitate the same solutions in the aforesaid aqueous salt solutions (e.g., $ZnCl_2$) at certain concentration.

Certain copolymers, such as copolymers of acrylonitrile with acrylic or methacrylic acid which copolymers are transformed into the corresponding salts by neutralization and are also soluble in water and dilute mineral acids have to be used as the precipitant, which advantageously contains a suitable crosslinking or curing agent, e.g., chromium (III), aluminum (III) or ferric salt or suitable aldehyde, diisocyanate and the like.

The following examples are presented to further illustrate the invention as aforedescribed; the examples are not, however, to be considered as limiting the scope thereof. All parts, proportions and ratios in the examples as well as the appended claim are by weight unless otherwise specified.

EXAMPLE 1

Into a 40°C warm solution of 30 wt. parts of acrylonitrile in 320 parts of water free of oxygen, 5 wt. parts of methacrylic acid and a redox type polymerization catalyst consisting of equal amounts (i.e., 2 parts) of a 5% aqueous solution of potassium pyrosulfite and ammonium peroxodisulfate, respectively, are introduced together with 0.5 part of 0.1% solution of copper sulfate. The polymerization is carried out under an inert atmosphere with stirring. Every 2 hours, methacrylic acid is added in four separate portions, always with 0.25 part of the above mentioned copper sulfate solution. The last portion of methacrylic acid is added with 1 part of the above mentioned solutions of pyrosulfite and peroxodisulfate. The resulting heterogeneous mixture contains a part of the copolymer as a coagulate and a part as dispersion and solution. To the cooled mixture, 8 parts of sodium hydroxide pellets are gradually added with cooling and stirring of the solution. The viscous solution of copolymer-sodium salt obtained after complete dissolution of the NaOH is applied as a thin layer on to the metal frame of a gilding roller, which has been previously covered with a layer of polyester knitted fabric or linen pre-fixed to the frame by means of a waterfast glue, as for instance, an epoxide adhesive.

The roller is slowly revolved and the copolymer solution is applied from behind the top thereof by means of a blade adjusted by a micrometer screw to form a thin uniform layer. The roller dips by its lower half into a 5% aqueous solution of potassium aluminum sulfate, which is acidified by means of 0.5% sulfuric acid. The excess bath is then wiped from the roller by a porous rubber roll. Above this roll, another porous cylinder revolves which is sprinkled with water and the roller is blown with warm air before a further layer is applied. Revolving of the roller and layer application continue until an elastic (swollen) layer of the required thickness is achieved. At the end of the application, the doctor blade is tightened for one complete revolution. The roller is then stopped, removed and washed in water. It is then placed into a mixture of 35 (volume) parts of dimethylsulfoxide, 60 parts of diethylene glycol and 5 parts of distilled water for several days and it is then ready for use. After the operation is finished, the roller is placed into this mixture again. If the relative humidity of air does not permanently drop below 55%, the roller surface retains its properties during the entire operation period. The same mixture is also used for washing the roller which is kept therein when not in operation.

EXAMPLE 2

Using the same equipment as in Example 1, a copolymer solution is applied, which has previously been prepared by partial hydrolysis of polyacrylonitrile as follows: Acrylonitrile (150 wt. parts) and 1 part of urea are dissolved in 845 parts of nitric acid having a density of 1.400 and freed of unbound nitrogen oxides. Ammonium peroxosulfate is then added as 4 parts of a 5% aqueous solution and the mixture is thoroughly stirred

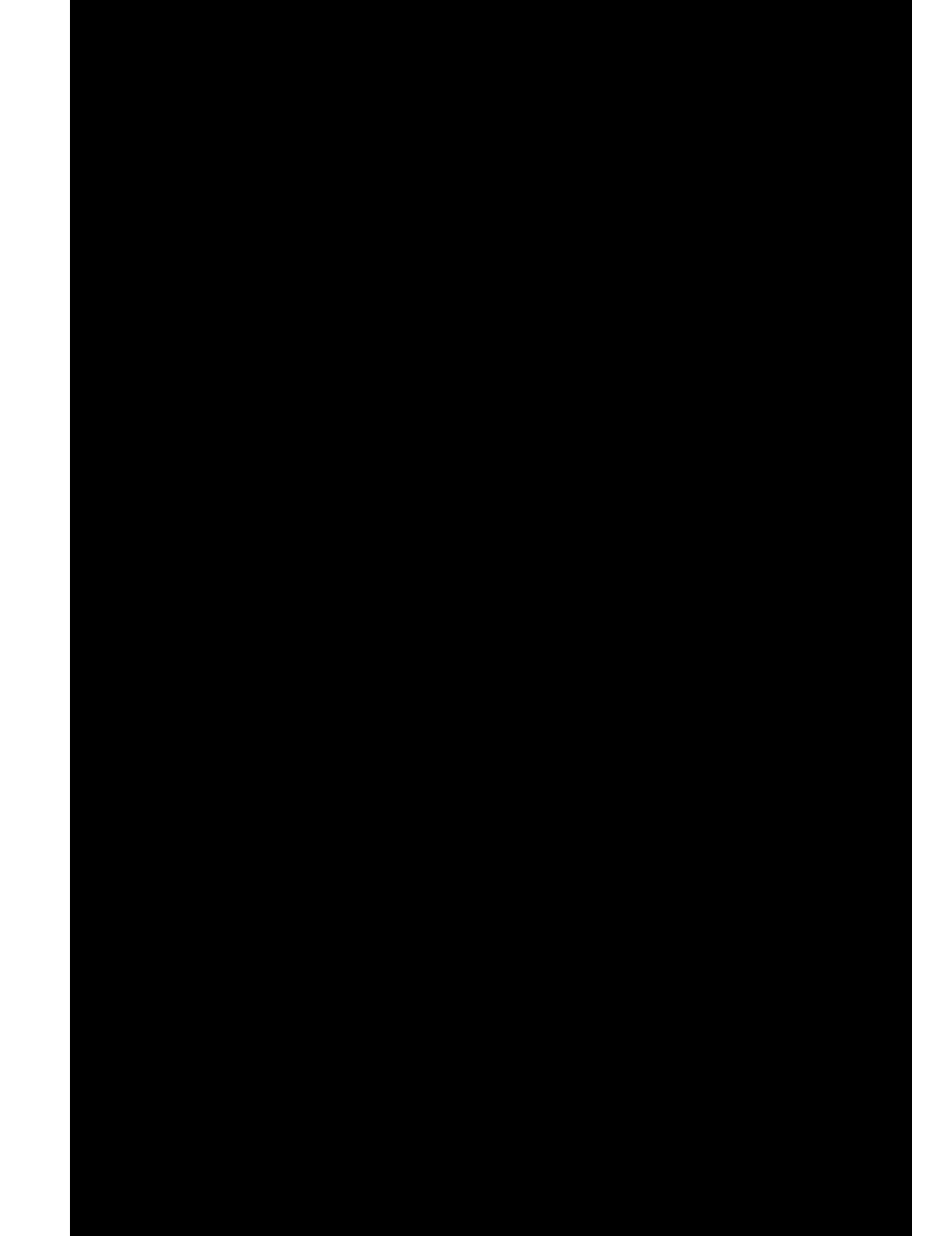

EXAMPLE 9

The procedure according to Example 8 is repeated with the exception that the solution in the pipette is maintained at 20°C for 8 days and the heavily swollen gel thus obtained after application to the roller and washing is placed into a 5% aqueous solution of chromium (III) sulfate at 20°C for 8 hours. The degree of swelling drops considerably in value corresponding approximately to the gel according to Example 8. The roller with the light green gel layer is thoroughly washed with water, placed for 48 hours into a mixture consisting of 65% of ethylene glycol and 35% of water, then for 24 hours into a mixture of 85% of ethylene glycol and 15% of water, and finally into pure ethylene glycol. The roller has similar properties and finds similar application to the roller according to Example 8.

In all the preceding examples, the acrylonitrile may be substituted by methacrylonitrile in part, preferably up to 10 wt. %. Other comonomers which can be substituted either singularly or in combinations, approximately up to 50 wt.% for that of the acrylonitrile, are acrylamide, methacrylamide, N—$C_1$ to —$C_4$ alkylacrylamides and N—$C_1$ to —$C_4$ alkylmethacrylamides, glycol monoacrylates and glycol monomethacrylates, ethoxyethyl acrylate and methacrylate, sodium ethylenesulfonate and the like. Most advantageous are the copolymers which contain at least 30 mole % (preferably at least 50 mole %) of the acrylonitrile component, irrespective of their preparation by copolymerization, partial hydrolysis, or combination of both these processes. The gels obtained by the partial hydrolysis of polyacrylonitrile in a homogeneous acid medium, e.g., in concentrated nitric acid, are superior to other by their remarkable strength and resistance to a mechanical damage.

Although the invention has been described with reference to specific examples, it is apparent to those skilled in the art that various modifications may be made thereto without departing from the spirit thereof.

What is claimed:

1. A roller suitable for the application of coloring materials onto a surface, comprising (I) an inner core of a material which does not substantially swell in aqueous solutions, (II) an outer surface including (1) copolymers of acrylonitrile with (2) at least one monomer selected from the group consisting of acrylamide, methacrylamide, N-lower alkyl acrylamides, N-lower alkyl methacrylamides, ethylenically unsaturated monocarboxylic acids, ethylene sulfonic acid, salts of said acids and compatible mixtures thereof and (3) at least one swelling agent selected from the group consisting of $C_{1-4}$ alkylene and polyalkylene glycols and their methoxy and ethoxy derivatives, glycerol and acetyl derivatives thereof, (a) phenols, aromatic alcohols, hydroaromatic alcohols, $C_{1-14}$ aliphatic alcohols, esters of (a), (b) fatty acids, and quarternary salts and esters of (b).

2. A roller as defined in claim 1 wherein said inner core (I) is selected from the group consisting of metal, plastic, wood, ceramic and hard rubber.

3. A roller as defined in claim 1 wherein said aqueous solution is water.

4. A roller as defined in claim 1 wherein said monomer (2) of said outer surface (II) is comprised of about 20 to 80% of two of said monomers.

5. A roller as defined in claim 1 wherein said outer surface (II) is derived from about 50% acrylonitrile and 50% methacrylic acid or acrylic acid.

6. A roller as defined in claim 1 wherein the polymer substance of said outer surface (II) is composed of about 50% acrylonitrile and 50% acrylamide units.

7. A roller as defined in claim 1 wherein the polymer substance of said outer surface (II) is composed of partly acid-hydrolyzed polyacrylonitrile.

8. A roller as defined in claim 1 wherein said ethylenically unsaturated monocarboxylic acid is acrylic or methacrylic acid.

9. A roller as defined in claim 1 wherein said acrylonitrile is substituted in part by up to about 10 weight % of methacrylonitrile.

10. A roller as defined in claim 1 wherein a member selected from the group consisting of acrylamide, methacrylamide, N—$C_1$ to —$C_4$ alkylacrylamides and methacrylamides, glycol monoacrylates and monomethacrylates, ethoxyethyl acrylates and methacrylates and ethylene sulfonate is substituted in part for said acrylonitrile.

11. A roller as defined in claim 9 wherein said polymer includes at least about 50 weight % of said acrylonitrile.

12. A roller as defined in claim 9 wherein said polymer contains at least about 30 wt. % of said acrylonitrile.

13. A roller as defined in claim 1 wherein said swelling agent is present in amounts of about 20 to 80% by weight.

14. A roller as defined in claim 1 wherein said swelling agent (3) further includes about 5 to 50% by weight of an inert organic solvent of polyacrylonitrile, based upon the weight of the total mixture.

15. A roller as defined in claim 14 wherein said solvent is selected from the group consisting of dimethylformamide, dimethylsulfoxide and cyclic ethylene carbonate.

* * * * *